United States Patent
Kim

(10) Patent No.: US 7,266,864 B2
(45) Date of Patent: Sep. 11, 2007

(54) ROTARY TYPE HINGE DEVICE FOR PORTABLE WIRELESS TERMINAL

(75) Inventor: Jae-Shik Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 135 days.

(21) Appl. No.: 10/808,779

(22) Filed: Mar. 25, 2004

(65) Prior Publication Data

US 2004/0200038 A1 Oct. 14, 2004

(30) Foreign Application Priority Data

Apr. 8, 2003 (KR) ............... 10-2003-0022098

(51) Int. Cl.
*E05D 3/10* (2006.01)
*H04B 1/38* (2006.01)

(52) U.S. Cl. ..................................... 16/367

(58) Field of Classification Search ............... 16/367, 16/366, 360, 343, 266, 255, 243, 235, 342; 403/119; 379/433.11–433.13, 433, 428; 361/681–683, 803; 455/90, 550, 556, 575
See application file for complete search history.

(56) References Cited

U.S. PATENT DOCUMENTS

| | | | | |
|---|---|---|---|---|
| 5,335,142 A * | 8/1994 | Anderson | ............ | 361/681 |
| 5,513,383 A * | 4/1996 | Tsao | ............ | 455/575.7 |
| 5,590,440 A * | 1/1997 | Pelt et al. | ............ | 16/429 |
| 5,751,548 A * | 5/1998 | Hall et al. | ............ | 361/686 |
| 6,108,868 A * | 8/2000 | Lin | ............ | 16/340 |
| 6,275,376 B1 * | 8/2001 | Moon | ............ | 361/683 |
| 6,292,980 B1 | 9/2001 | Yi et al. | | |
| 6,549,789 B1 * | 4/2003 | Kfoury | ............ | 455/550.1 |
| 6,553,625 B2 * | 4/2003 | Lin et al. | ............ | 16/342 |
| 6,694,570 B2 * | 2/2004 | Chen | ............ | 16/367 |
| 2003/0040288 A1 * | 2/2003 | Kang et al. | ............ | 455/90 |
| 2004/0141287 A1 * | 7/2004 | Kim et al. | ............ | 361/683 |
| 2004/0198474 A1 * | 10/2004 | Jung et al. | ............ | 455/575.1 |
| 2004/0203532 A1 * | 10/2004 | Mizuta | ............ | 455/90.3 |
| 2005/0198779 A1 * | 9/2005 | Jung et al. | ............ | 16/367 |

FOREIGN PATENT DOCUMENTS

CN 1461168 12/2003

* cited by examiner

*Primary Examiner*—J. J. Swann
*Assistant Examiner*—Ruth C Rodriguez
(74) *Attorney, Agent, or Firm*—The Farrell Law Firm

(57) ABSTRACT

A rotary type hinge device, installed between a terminal body and a folder of the portable wireless terminal. The hinge device has a first rotation axis for opening and closing operations of the terminal body and folder, and a second rotation axis extending perpendicular to the first rotation axis to be rotated relative to the first rotation axis. The hinge device is adapted to rotate the folder about the second rotation axis in a state wherein the folder and terminal body are opened. The hinge device comprises a first hinge housing coupled to the terminal body to rotate about the first rotation axis; a main shaft having its one end fixed to the inner peripheral surface of the first hinge housing and the other end thereof protruding outwardly from one side of the first hinge housing; and a second hinge housing rotatably coupled to the other end of the main shaft protruded outwardly from the first hinge housing and adapted to rotate about the second rotation axis. The second hinge housing is fixed to the folder. The rotary type hinge device constructed as stated above enables the biaxial rotation of the folder, thereby allowing the reversal of front and rear surfaces thereof. Therefore, the portable wireless terminal has advantages that the change of the specification or design thereof is easy and its convenience of use is increased.

27 Claims, 16 Drawing Sheets

ROTARY TYPE HINGE DEVICE FOR PORTABLE WIRELESS TERMINAL

This application claims priority to an application entitled "ROTARY TYPE HINGE DEVICE FOR PORTABLE WIRELESS TERMINAL", filed in the Korean Industrial Property Office on Apr. 8, 2003 and assigned Ser. No. 2003-22098, the contents of which are hereby incorporated by reference.

BACKGROUND OF THE INVENTION

1. Field of the Invention

The present invention relates to a hinge device for a portable wireless terminal, and more particularly to a rotary type hinge device of biaxial rotation, which enables the reversal of front and rear surfaces of a folder, opened away from a terminal body of a portable wireless terminal, while rotating relative to the terminal body.

2. Description of the Related Art

Generally, portable wireless terminals are classified into bar type terminals, flip type terminals and folder type terminals, in accordance with an external form thereof.

The bar type terminals are configured so that a single body housing thereof is provided with data input and output means including receiver and transmitter modules. In the case of the bar type terminals, there is a disadvantage that a keypad, as data input means, is always exposed to accidental misuse and damage that may cause the keypad to malfunction. In addition, the bar type terminals are limited in extent of their miniaturization due to a technologically required minimal distance between the receiver and transmitter modules.

The flip type terminals generally comprise a terminal body, a flip cover, and a hinge device adapted to rotatably couple the flip cover to the terminal body. The terminal body is mounted with data input and output means including receiver and transmitter modules. The flip cover serves as a cover for a keypad, which is a data input means, thereby preventing the mistreatment and eventual malfunctioning of the keypad. However, the flip type terminals are still limited in their miniaturization due to a technologically required minimal distance between receiver and transmitter modules thereof.

The folder type terminals generally comprise a terminal body, a folder, and a hinge device adapted to rotatably couple the folder to the terminal body. The folder is adapted to be opened away from or closed towards the terminal body according to its rotation relative to the terminal body. In a folded state wherein the folder is in contact with the terminal body, the portable wireless terminal is in a call waiting mode while preventing the damage to or malfunction of a keypad as data input means mounted on the terminal body. Further, in an unfolded state wherein the folder is rotated to an open position, the portable wireless terminal is in a conversation mode while ensuring a sufficient distance between transmitter and receiver modules, thereby advantageously miniaturizing the terminal. For this reasons, popularity of such folder type terminals is on the rise.

Those skilled in the art will easily appreciate such bar type, flip type or folder type terminals classified as stated above.

The hinge device provided in the flip type or folder type terminals and adapted to rotatably couple the flip cover or folder to the terminal body, is configured to cause the flip cover or folder to be forced toward its open position. The hinge device achieves that without requiring any additional external force when the flip cover or folder is opened away from the terminal body exceeding a predetermined angle. When the angle formed by the flip cover or folder is below the predetermined angle, the flip cover or folder is forced by the hinge device to come into close contact with the terminal body.

The conventional hinge device for use in the flip type or folder type portable wireless terminals is disclosed in U.S. Pat. No. 6,292,980, granted to the applicant of the present invention. The hinge device, disclosed in that patent comprises a hinge cam and hinge shaft, which are formed with mountain-shaped portions or valley-shaped portions, respectively, and a hinge spring received in a hinge housing and adapted to urge the hinge cam to come into close contact with the hinge shaft. The hinge device is designed to open and close a flip cover or folder of a portable wireless terminal by means of circumferentially curved surfaces of the mountain-shaped and valley-shaped portions and by means of elastic force of the hinge spring.

Although functions of the portable wireless terminals have rapidly expanded as mobile services have become increasingly diversified, the conventional hinge device has not varied its function of simply causing the flip cover or folder of the portable wireless terminal to be opened away from or closed to the terminal body. This causes many limitations in specifications and abilities of portable wireless terminals. For example, there are limitations in the addition of certain devices, such as a camera lens, to the terminals for enabling users of such terminals to utilize various available and anticipated mobile services. Specifically, in the case of the camera lens, it is difficult to harmonize an image capturing direction of the camera lens with an image display direction of a display device provided in the portable wireless terminal. In addition to limitations of the specification and design of terminals, the conventional hinge device has a disadvantage, it can't satisfy ever more diverse customers' tastes, and increasingly diversified mobile services.

SUMMARY OF THE INVENTION

Therefore, the present invention has been achieved in view of the above problem, and it is an object of the present invention to provide a hinge device for a portable wireless terminal, which is advantageous in enabling changes to ability, specification, and design of the portable wireless terminal.

It is another object of the present invention to provide a hinge device for a portable wireless terminal, which can satisfy diverse customers' tastes.

It is yet another object of the present invention to provide a hinge device for a portable wireless terminal, which enables the reversal of front and rear surfaces of a folder provided in the portable wireless terminal.

In accordance with one aspect of the present invention, the above and other objects can be accomplished by the provision of a rotary type hinge device for a portable wireless terminal, which is installed between a terminal body and a folder of the portable wireless terminal. The hinge device having a first rotation axis for opening and closing operations of the terminal body and folder and a second rotation axis extending perpendicular to the first rotation axis and adapted to rotate relative to the first rotation axis, the hinge device being adapted to rotate the folder about the second rotation axis in a state wherein the folder and terminal body are opened. The hinge device comprises a first hinge housing coupled to the terminal body to rotate about the first rotation axis, the first hinge housing being formed with a certain-shaped fixing portion at its inner peripheral surface, and an opening adapted to expose the fixing portion in a direction of the second rotation axis. The hinge further comprises a main shaft provided at its one end with a fixing end having a shape corresponding to that of the fixing portion, the main shaft extending in the direction of the second rotation axis and being adapted to be protruded outwardly through the opening of the first hinge housing at the other end thereof. Moreover the hinge includes a second hinge housing rotatably coupled to the other end of the main shaft protruded outwardly from the first hinge housing and adapted to rotate about the second rotation axis, the second hinge housing being fixed to the folder.

In accordance with another aspect of the present invention, there is provided a rotary type hinge device for a portable wireless terminal, it comprises a first hinge housing, which is rotatable about a first rotation axis longitudinally extending through both ends thereof, the first hinge housing being formed at its inner peripheral surface with a certain-shaped fixing surface, and at its outer peripheral surface with an opening adapted to expose the fixing surface perpendicular to the first rotation axis. The hinge further comprises a main shaft provided at its one end with a fixing end having a shape corresponding to that of the fixing surface, the main shaft extending from the fixing end in a direction perpendicular to the first rotation axis, and being adapted to be protruded outwardly through the opening of the first hinge housing at the other end thereof, thereby providing a second rotation axis. Moreover the hinge includes a second hinge housing rotatably coupled to the other end of the main shaft and adapted to rotate about the second rotation axis.

In accordance with yet another aspect of the present invention, there is provided a rotary type hinge device for a portable wireless terminal, which is installed between a terminal body and a folder of the portable wireless terminal, the hinge device having a first rotation axis for opening and closing operations of the terminal body and folder and a second rotation axis extending perpendicular to the first rotation axis and adapted to rotate relative to the first rotation axis, the hinge device being adapted to rotate the folder about the second rotation axis in a state wherein the folder and terminal body are opened, the hinge device comprising: a first hinge housing coupled to the terminal body to rotate about the first rotation axis, the first hinge housing being formed with a fixing groove surrounded by ribs extended to a certain height at its inner peripheral surface, and an opening adapted to expose the fixing groove in a direction of the second rotation axis. The hinge further comprises a main shaft provided at its one end with a fixing end having a shape corresponding to that of the fixing groove, the main shaft extending in the direction of the second rotation axis and adapted to be protruded outwardly through the opening of the first hinge housing at the other end thereof. Moreover the hinge includes a second hinge housing rotatably coupled to the other end of the main shaft protruded outwardly from the first hinge housing and adapted to rotate about the second rotation axis, the second hinge housing being fixed to the folder.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
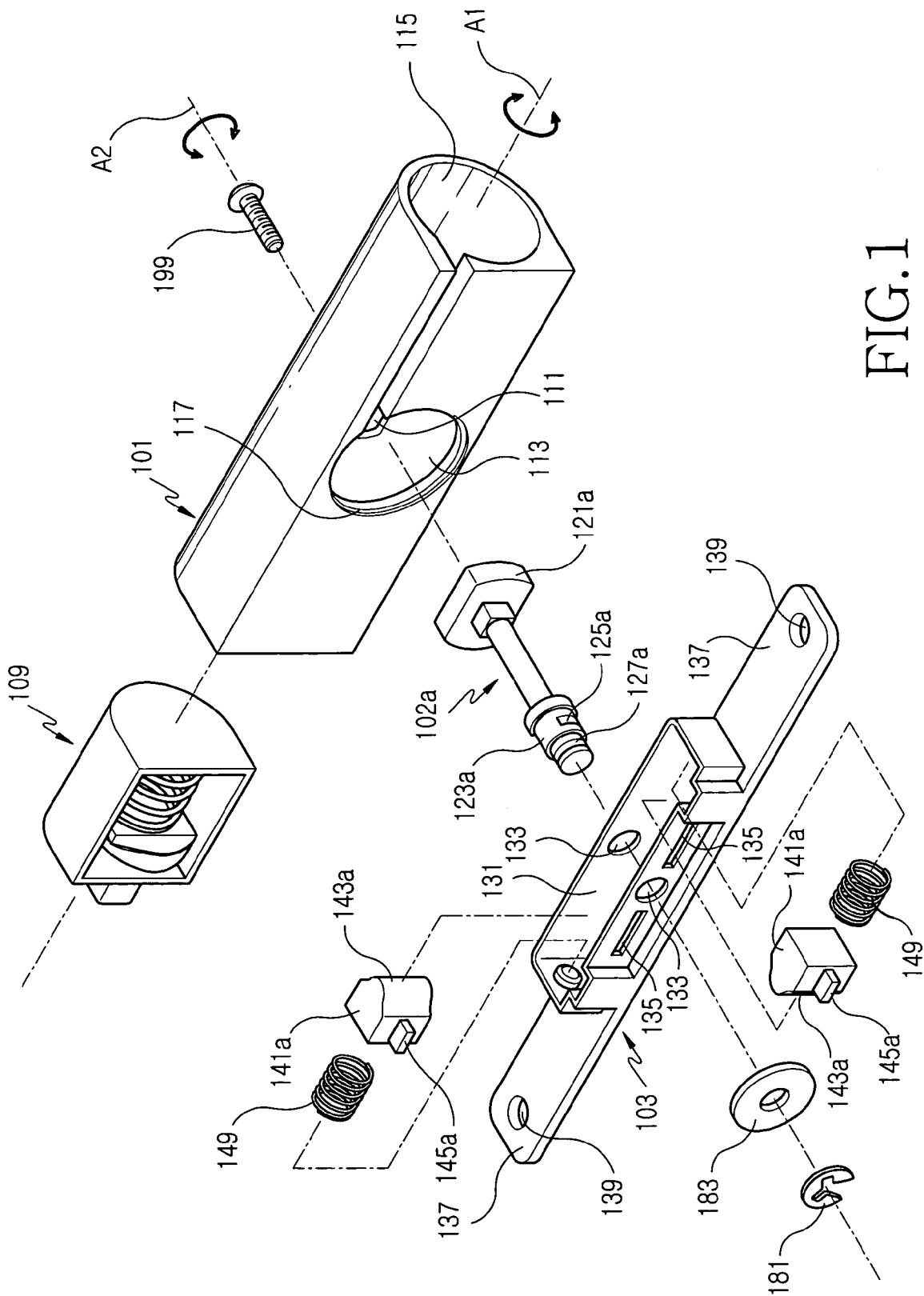
FIG. 1 is an exploded perspective view illustrating a rotary type hinge device for a portable wireless terminal in accordance with a preferred embodiment of the present invention.

Preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear. Also, the terms used in the following description are terms defined taking into consideration the functions obtained in accordance with the present invention. The definitions of these terms should be determined based on the whole content of this specification and may be changed at the option of a user or common practice.

FIG. 1 is an exploded perspective view illustrating a rotary type hinge device of a portable wireless terminal in accordance with a preferred embodiment of the present invention. As shown in FIG. 1, the rotary type hinge device designated as a reference numeral 100, comprises a first hinge housing 101, a main shaft 102, and a second hinge housing 103. The rotary type hinge device 100 is adapted to be installed between a terminal body and a folder of a portable wireless terminal (not shown). The rotary type hinge device 100 provides a first rotation axis A1 for opening and closing operations of the folder and terminal body, and a second rotation axis A2 extending perpendicular to the first rotation axis A1.

The first hinge housing 101 is inserted into the terminal body of the portable wireless terminal and adapted to rotate about the first rotation axis A1. The first rotation axis A1 is an opening and closing axis of the folder and terminal body of the portable wireless terminal. The first hinge housing 101 is formed at its one surface with an opening 113 for enabling intercommunication between the. interior and exterior of the first hinge housing 101. The first hinge housing 101 is also formed with a recessed fixing surface 111, having a certain shape, at the inner surface of the first hinge housing 101. The recessed fixing surface 111 is adapted to be exposed through the opening 113. The fixing surface 111 serves to fix the main shaft 102, thereby preventing the rotation of the main shaft 102. For this, the fixing surface 111 is preferably formed into an angled shape.

The first hinge housing 101 is formed at its outer peripheral surface with a guide groove 117 along the edge of the opening 113. When the folder, opened away from the terminal body, rotates about the second rotation axis A2 extending perpendicular to the first rotation axis A1, the guide groove 117 serves to constrain the angular rotation range of the folder.

The first hinge housing 101 receives an opening/closing hinge module 109 therein at its one side. The opening/closing hinge module 109 is adapted to provide a rotating force to cause the folder to be unfolded, namely opened if the folder is opened away from the terminal body exceeding a predetermined angle, and also adapted to provide a rotating force to cause the folder to be folded, namely closed if the folder is opened away from the terminal body below the predetermined angle. The opening/closing hinge module 109 is applied to the hinge device 100 in the manner described in U.S. Pat. No. 6,292,980, filed on Sep. 25, 2001 and issued to the applicant of the present invention. The first hinge housing 101 is formed with a dummy hole 115 at an opposite side of the hinge module 109. The dummy hole 115 is adapted to be coupled with a certain-shaped hinge dummy (not shown), thereby allowing the first hinge housing 101 to be rotatably coupled with the terminal body of the portable wireless terminal.

Figure 2:
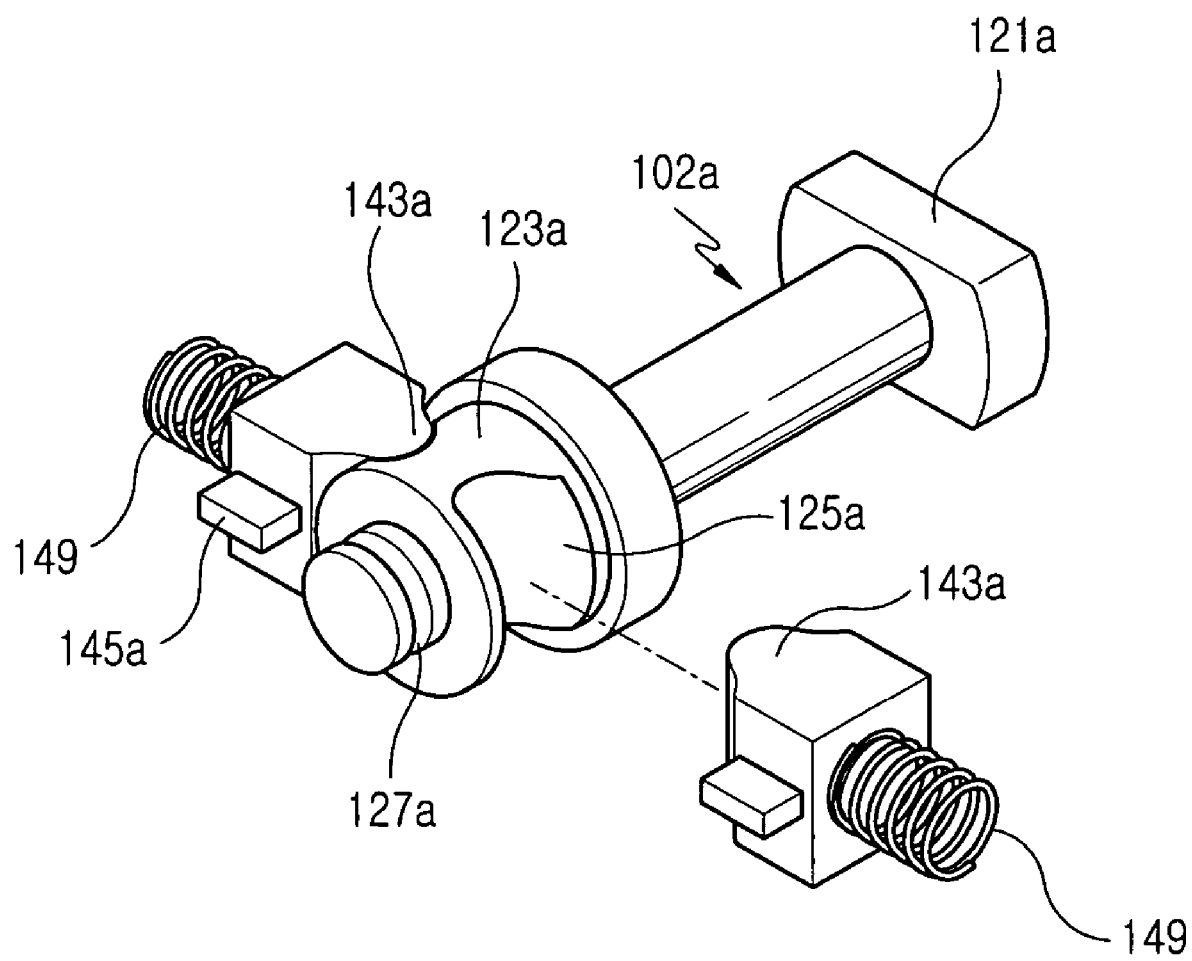
FIG. 2 is a perspective view illustrating a shaft cam and stopper cam of the rotary type hinge device shown in FIG. 1.
Figure 3:
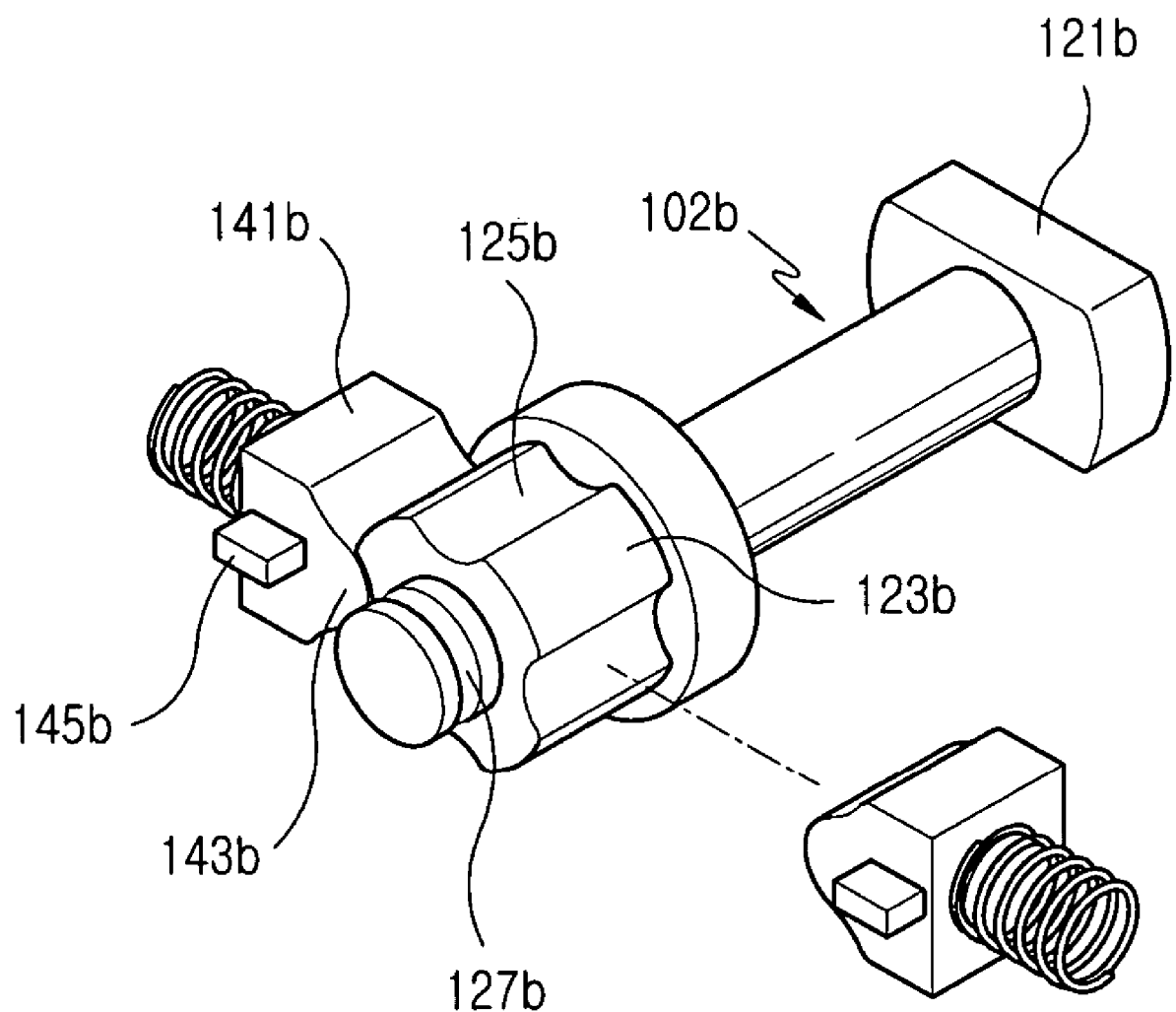
FIG. 3 is a perspective view illustrating another type of shaft cam and stopper cam of the rotary type hinge device shown in FIG. 1.
Figure 4:
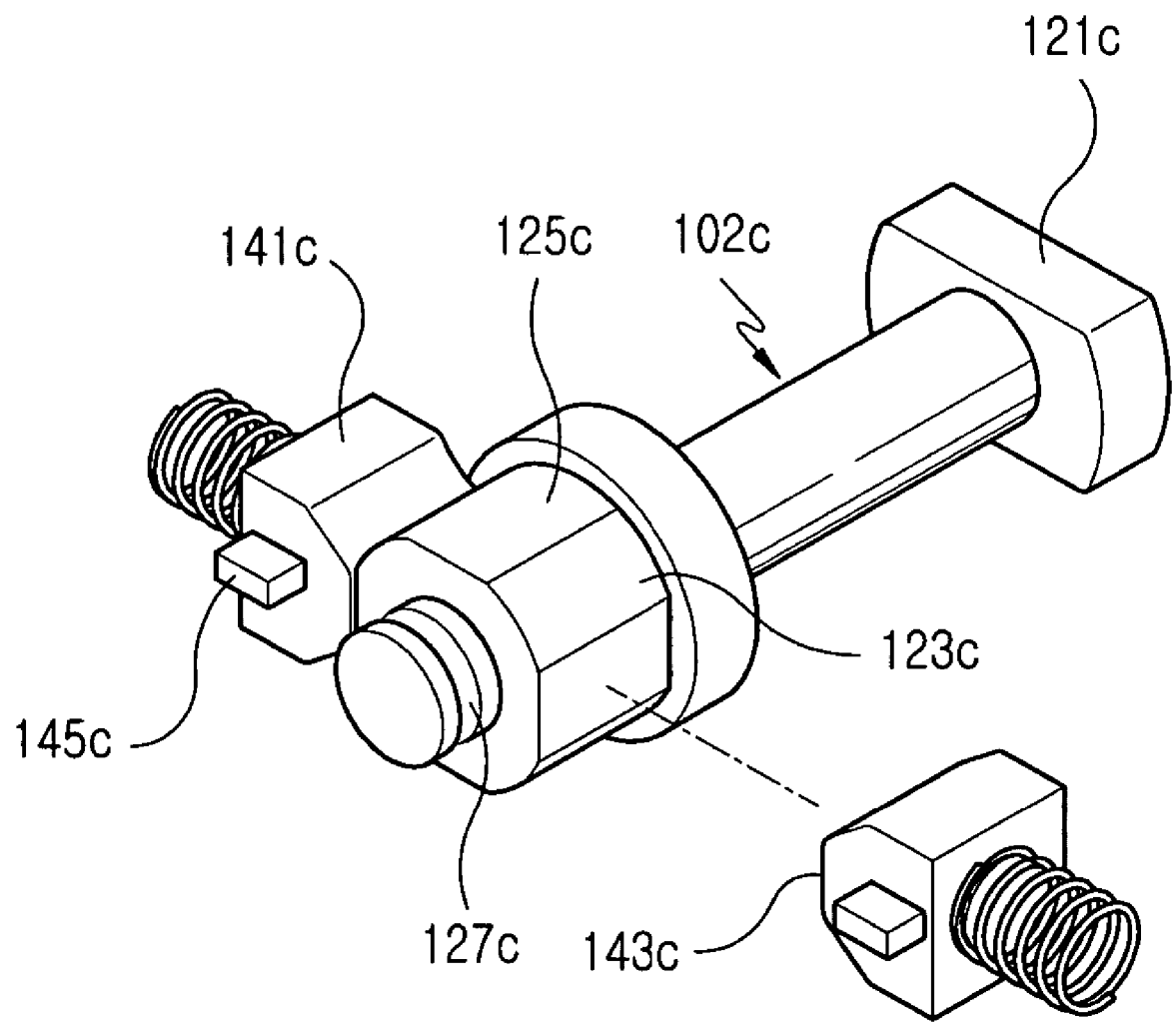
FIG. 4 is a perspective view illustrating still another type of shaft cam and stopper cam of the rotary type hinge device shown in FIG. 1.

Referring to FIG. 2, the main shaft 102a is provided at its one end with a fixing end 121a having a shape corresponding to the fixing surface 111 (FIG. 1), and at the other end with a fastening groove 127a and shaft cam 123a. The fastening groove 127a is adapted to be fastened with an E-ring 181 (FIG. 1). The shaft cam 123a is formed at its outer peripheral surface with at least one pair of stopper recesses 125a arranged on opposite sides of the shaft cam, respectively. As shown in FIG. 2, the stopper recesses 125a extend perpendicular to the second rotation axis A2. Further, as shown in FIG. 3, the shaft cam 123b may be formed at its outer peripheral surface with stopper recesses 125b extending horizontally to the second rotation axis A2. Furthermore, as shown in FIG. 4, the shaft cam 123c may be formed at its outer peripheral surface with at least one pair of flat stopper surfaces 125c. The main shaft 102b shown in FIG. 3 or main shaft 102c shown in FIG. 4 may be formed with the fixing end 121b or 121c and the fastening groove 127b or 127c, respectively, which are the same as those of the main shaft 102a shown in FIG. 1.

Referring back to FIG. 1, the main shaft 102a, 102b (FIG. 3) or 102c (FIG. 4) is adapted to be fastened using a screw 199, but it may be fixed to the first hinge housing 101 using various methods such as adhesion and so on.

The second hinge housing 103 is rotatably coupled to the end of the main shaft 102a, 102b (FIG. 3), or 102c (FIG. 4), and adapted to rotate about the second rotation axis A2. As the second hinge housing 103 rotates about the second rotation axis A2, the folder, opened away from the terminal body, enables the reversal of front and rear surfaces thereof. The second hinge housing 103 has a receiving space defining unit 131. The receiving space defining unit 131 is formed at its upper and lower end surfaces with coupling holes 133, respectively, through which the end of the main shaft 102a, 102b (FIG. 3) or 102c (FIG. 4) is penetrated. The coupling holes 133 are positioned on the second rotation axis A2. The fastening groove 127a formed at the end of the main shaft 102a is protruded outwardly from the upper end surface of the second hinge housing 103 after passing through the coupling holes 133, and then the E-ring 181 is fastened to the protruded fastening groove 127a. The E-ring 181 and the upper end of the second hinge housing 103 interpose a washer 183 therebetween. The washer 183 is coupled to the end of the main shaft 102a, and adapted to prevent the wearing of the E-ring 181 and second hinge housing 103 during the rotation of the second hinge housing 103. When the second hinge housing 103 is coupled to the end of the main shaft 102a, the shaft cam 123a is positioned in the receiving space defining unit 131 of the second hinge housing 103.

The second hinge housing 103 has fastening arms 137 extended outwardly in opposite directions from the both sides thereof. The fastening arms 137 are formed with fastening holes 139 at their opposite ends, thereby providing means for coupling the second hinge housing 103 to the folder.

The receiving space defining unit 131 of the second hinge housing 103 receives stopper cams 141a at both sides of the shaft cam 123a positioned therein. Each stopper cam 141a is formed at its one end with a stopper projection 143a, which corresponds to the stopper recesses 125a formed at the outer peripheral surface of the shaft cam 123a. As shown in FIGS. 2 to 4, the shape of the stopper cam 141a, 141b or 141c is variable according to the shape of the shaft cam 123a, 123b or 123c.

The stopper cams 141a are adapted, to receive an elastic force of coil springs 149, thereby coming into close contact with the shaft cam 123a. As the second hinge housing 103 rotates, the outer peripheral surface of the shaft cam 123a comes into sldiable contact with the stopper projection 143a, thereby causing the stopper recess 125a and stopper projection 143a to be engaged due to the elastic force of the coil spring 149. At this engagement position therebetween, the rotation of the second hinge housing 103 is stopped.

Figure 6:
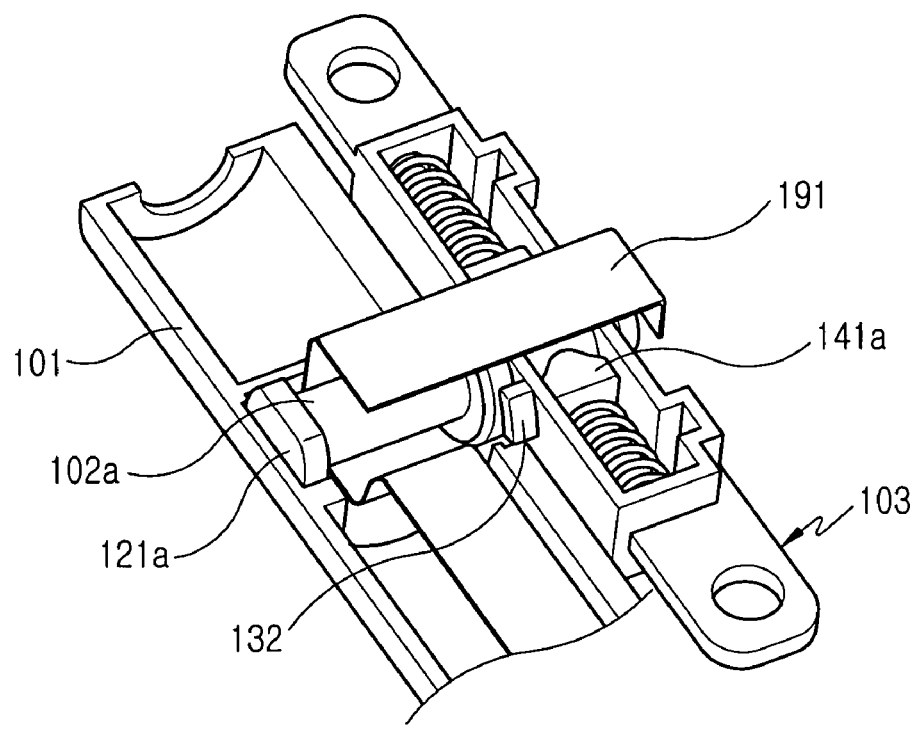
FIG. 6 is a partial cut-away perspective view illustrating a state wherein a flexible printed circuit is mounted through the rotary type hinge device shown in FIG. 1.
Figure 7:
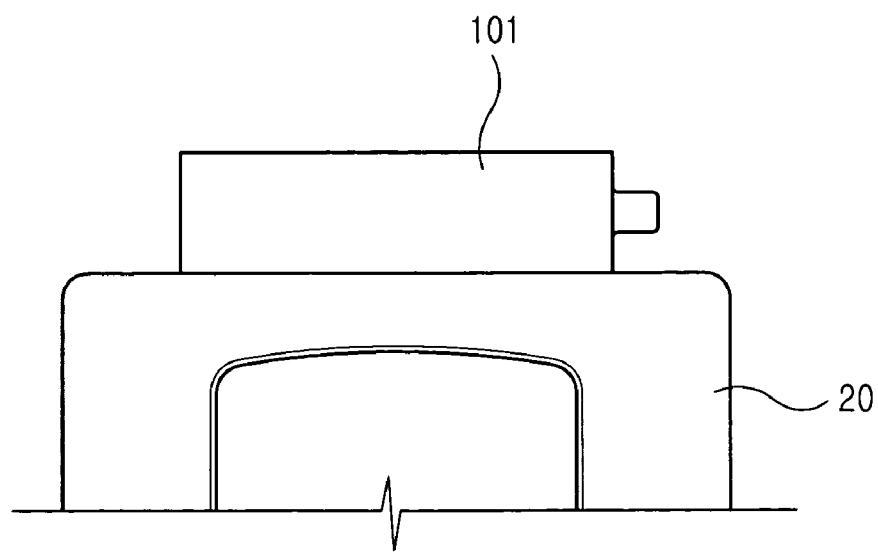
FIG. 7 is a perspective view illustrating a state wherein the rotary type hinge device shown in FIG. 1 is coupled to the folder.
Figure 8:
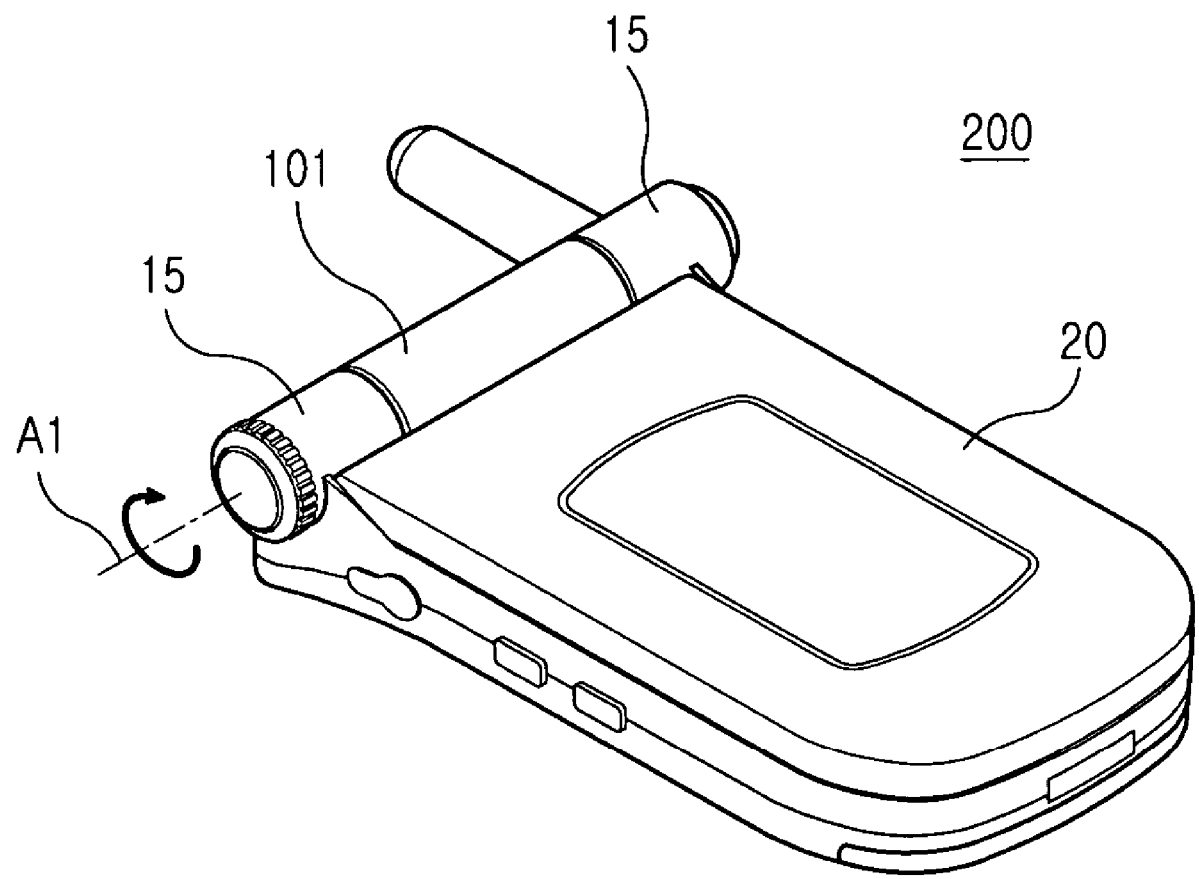
FIG. 8 is a front view illustrating a portable wireless terminal employed with the rotary type hinge device shown in FIG. 1.

Illustrated in FIG. 6, the second hinge housing 103 is provided at its lower end surface with a slidable protuberance 132, which is adapted to slidably move within the guide groove 117 of the first hinge housing 101. The guide groove 117 serves to restrict the rotation range of the slidable protuberance 132, thereby preventing the folder from rotating excessively in only one direction. If the folder rotates excessively in only one direction, a flexible printed circuit extending through the second hinge housing 103 may be damaged.

As shown in FIGS. 2 and 3, the stopper recesses 125a or 125b may extend vertically or horizontally to the second rotation axis A2. In addition, as shown in FIG. 4, the shaft cam 123c may be formed at its outer peripheral surface with the flat stopper surfaces 125c, instead of the recesses, to effectively perform the role of a stopper. In this case, it should be clearly understood that the stopper cam 141c must have the stopper projection 143a or 143b (FIG. 3), or flat stopper surfaces 143c (FIG. 4) having a shape corresponding to the stopper recesses 125a or 125b (FIG. 2), or flat stopper surfaces 125c (FIG. 3).

Referring again to FIG. 1, the stopper cam 141a is adapted to come into slidable contact with the shaft cam 123a, thereby linearly reciprocating within the receiving space defining unit 131. In order to guide the linear reciprocating movements of the stopper cams 141a while preventing the stopper cams 141a from being released from the receiving space defining unit 131, each stopper cam 141a is formed with a guide protrusion 145a at its outer peripheral surface. In addition, the upper or lower end surface of the receiving space defining unit 131 is formed with sliding guides 135 corresponding to the guide protrusions 145a of the stopper cams 141a. Each sliding guide 135 may be a depressed portion at the inner wall of the receiving space portion 131, or may be a hole penetrating between the interior and exterior of the second hinge housing 103.

Figure 5:
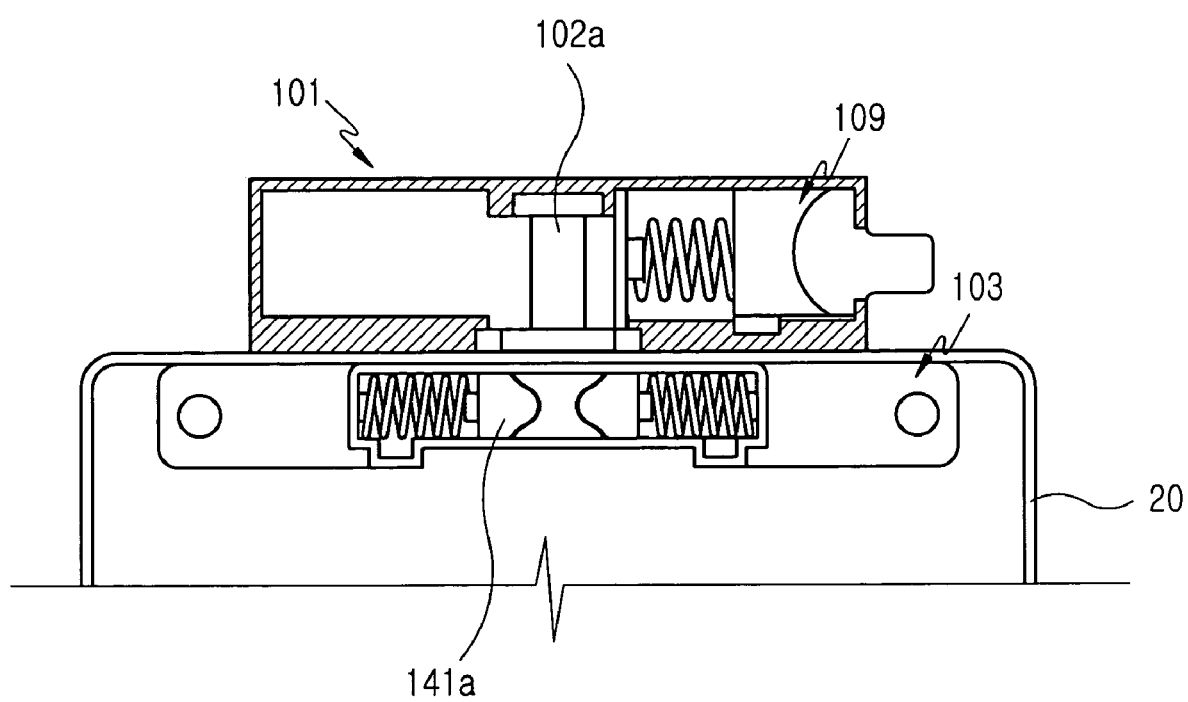
FIG. 5 is a partial cut-away perspective view illustrating a state wherein the rotary type hinge device shown in FIG. 1 is coupled to a folder of the portable wireless terminal.

FIG. 5 is a partial cut-away perspective view illustrating a state wherein the rotary type hinge device shown in FIG. 1 is coupled to a folder of the portable wireless terminal. FIG. 5 illustrates the second hinge housing 103 fixed inside the one end of a folder of a portable wireless terminal, designated as a reference numeral 20. Although not shown, the second hinge housing 103 is fixed inside the folder 20 by fastening screws through the fastening holes 139 (FIG. 1) of the second hinge housing 103. As the second hinge housing 103 is fixed inside the one end of the folder 20, the first hinge housing 101 is positioned at the one end surface of the folder 20.

FIG. 6 is a perspective view illustrating a state wherein a flexible printed circuit, designated as a reference numeral 191, is mounted through the rotary type hinge device 100. As shown in FIG. 6, the flexible printed circuit 191 extends longitudinally from the upper end of the main shaft 102, thereby entering into the first hinge housing 101. Preferably, the flexible printed circuit 191 is wound at least half way around the main shaft 102a within the first hinge housing 101. This prevents excessive force from being applied to the flexible printed circuit 191 in a state wherein the folder 20, opened away from the terminal body, is rotated about the second rotation axis A2 (FIG. 1).

Figure 9:
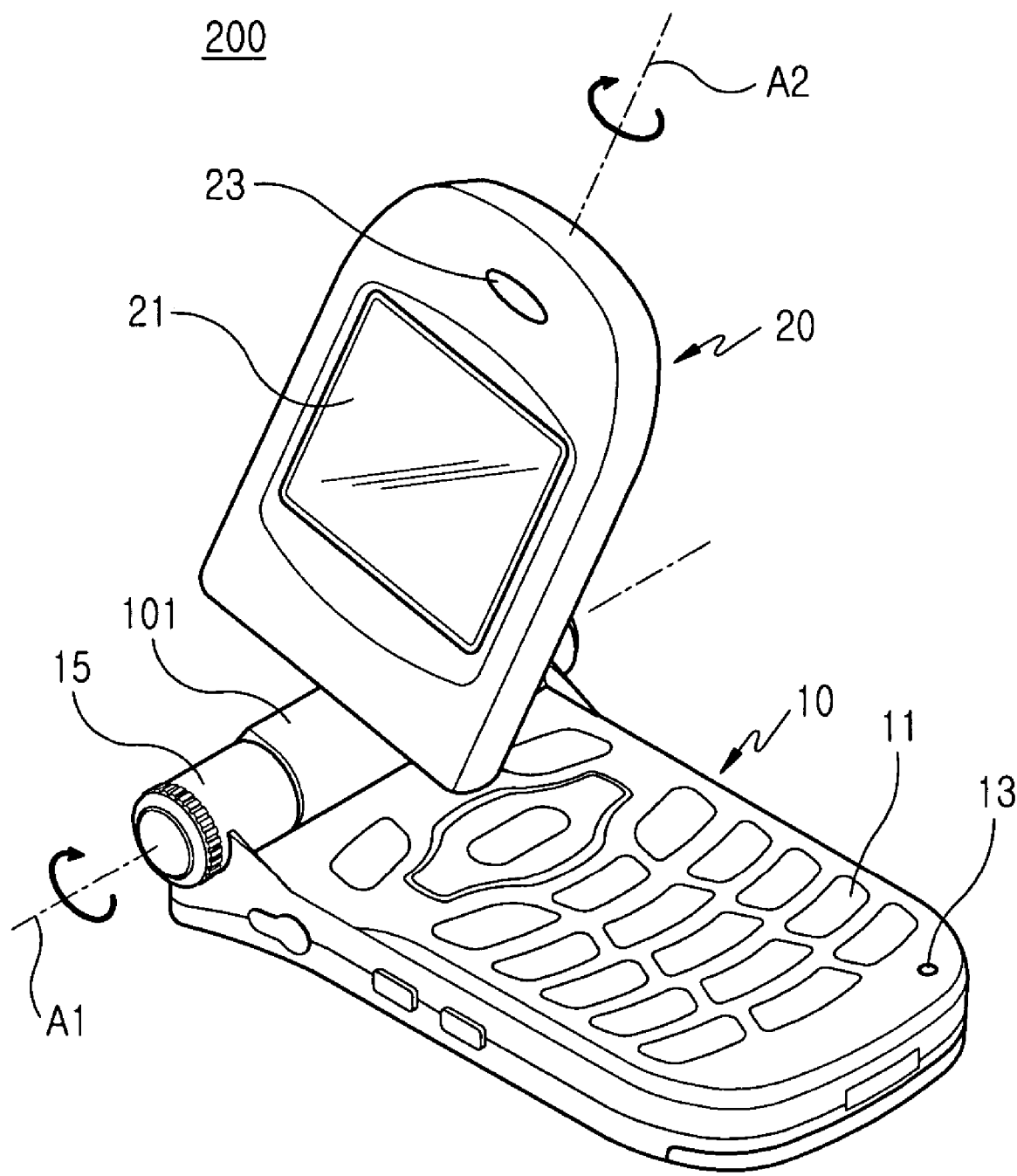
FIG. 9 is a perspective view illustrating a reversal operation of front and rear surfaces of the folder provided in the portable wireless terminal shown in FIG. 8.

FIGS. 7 to 10 illustrate a state wherein the rotary type hinge device 100 constructed as stated above is mounted in a portable wireless terminal, designated as a reference numeral 200. As shown in FIGS. 7 to 10, the portable wireless terminal 200 comprises a terminal body 10, and the folder 20. The terminal body 10 is provided with a keypad 11 (FIG. 9) and a transmitter 13 (FIG. 9). The folder is provided with a display device 21 and a receiver 23. The terminal body 10 is also formed with respective side hinge arms 15 at both sides adjacent to the one end thereof.

The first hinge housing 101 of the rotary type hinge device 100 is positioned at the one end of the folder 20 of the portable wireless terminal 200. As the first hinge housing 101 is rotatably coupled between the side hinge arms 15, the folder 20 is adapted to rotate relative to the first rotation axis A1. Referring to FIG. 9, the folder 20, opened away from the terminal body 10, is rotated about the second rotation axis A2, thereby causing the reversal of the front and rear surfaces thereof. Then, as shown in FIG. 10, as the folder 20, having its front and rear surfaces reversed with each other, is closed to the terminal body 10, the display device 21 of the folder 20 is adapted to be exposed to the outside.

In the case of the terminal 200 constructed as stated above, one of the side hinge arms 15 is installed with a camera lens (not shown) to capture images in a direction of the first rotation axis A1. Alternatively, a camera lens rotatable relative to the first rotation axis A1 may be installed to one of the side hinge arms 15.

If the camera lens is mounted to capture images in the direction of the first rotation axis A1, as shown in FIG. 9, it can capture images or perform video communications in a state wherein the folder 20 is rotated at an angle of 90° relative to the second rotation axis A2.

Figure 10:
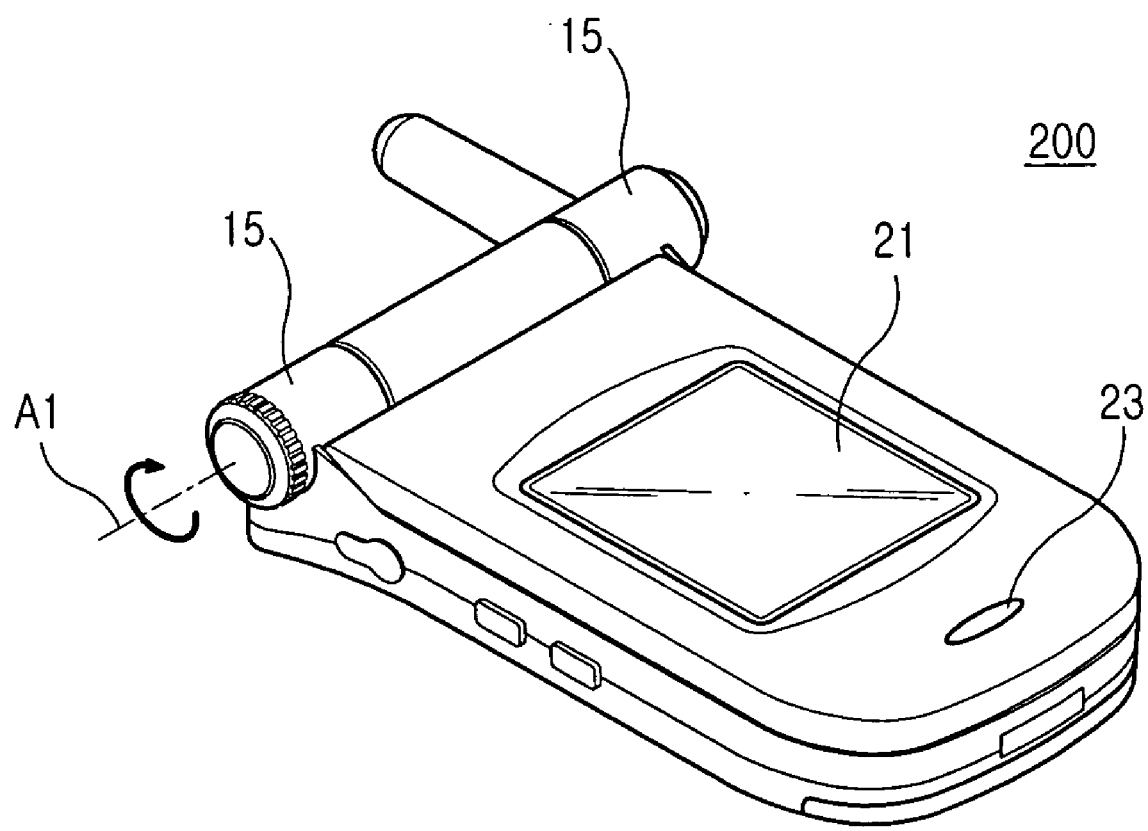
FIG. 10 is a front view illustrating a state wherein the front and rear surfaces of the folder, provided in the portable wireless terminal shown in FIG. 8, are reversed with each other.

If the camera lens is rotatably installed relative to the first rotation axis A1, as shown in FIG. 10, it is allowed to perform video communications by positioning the camera lens and the display device 21 to face the same direction in a state wherein the display device 21 is exposed. In addition, If the camera lens is positioned away from the display device 21, namely, positioned to face the rear surface of the portable wireless terminal 200, the image capturing using the portable wireless terminal 200 becomes easy.

Figure 11:
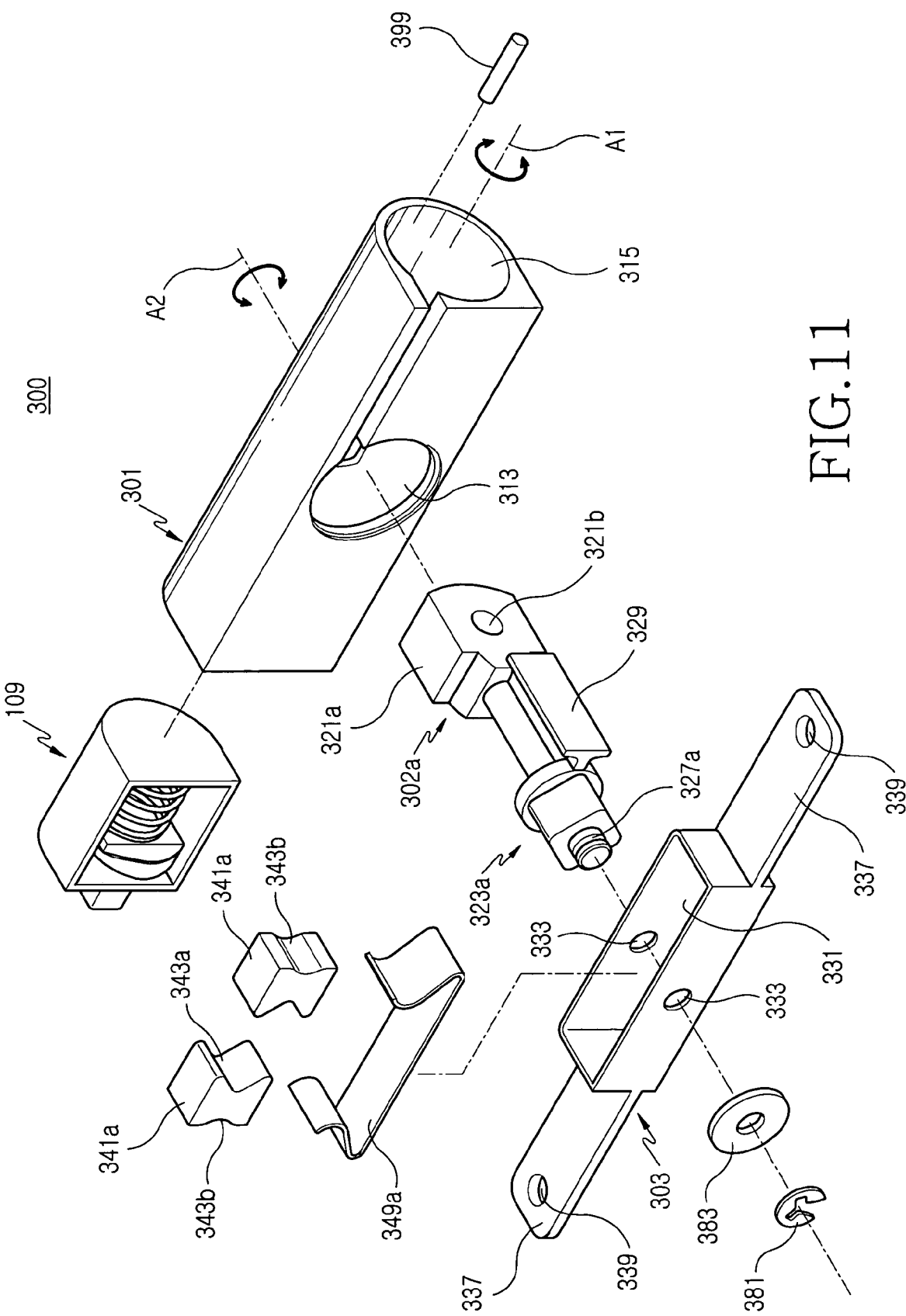
FIG. 11 is an exploded perspective view illustrating a rotary type hinge device for a portable wireless terminal in accordance with another preferred embodiment of the present invention.

FIG. 11 is an exploded perspective view illustrating a rotary type hinge device, designated as a reference numeral 300, of the portable wireless terminal, in accordance with another preferred embodiment of the present invention. As shown in FIG. 11, the rotary type hinge device 300 according to another preferred embodiment of the present invention comprises a a first hinge housing 301, a main shaft 302 and a second hinge housing 303. The rotary type hinge device 300 is adapted to be installed between a terminal body and a folder of a portable wireless terminal. The rotary type hinge device 300 has a first rotation axis A1 for opening and closing operations of the folder and terminal body, and a second rotation axis A1 extending perpendicular to the first rotation axis A1, and being adapted to rotate the folder, opened away from the terminal body, about the second rotation axis A2.

The first hinge housing 301 is inserted into the terminal body of the portable wireless terminal and adapted to rotate about the first rotation axis A1. The first rotation axis A1 is an opening and closing axis of the folder and terminal body of the portable wireless terminal. The first hinge housing 301 is formed at its one surface with an opening 313 for enabling intercommunication between the interior and exterior of the first hinge housing 301.

Figure 12:
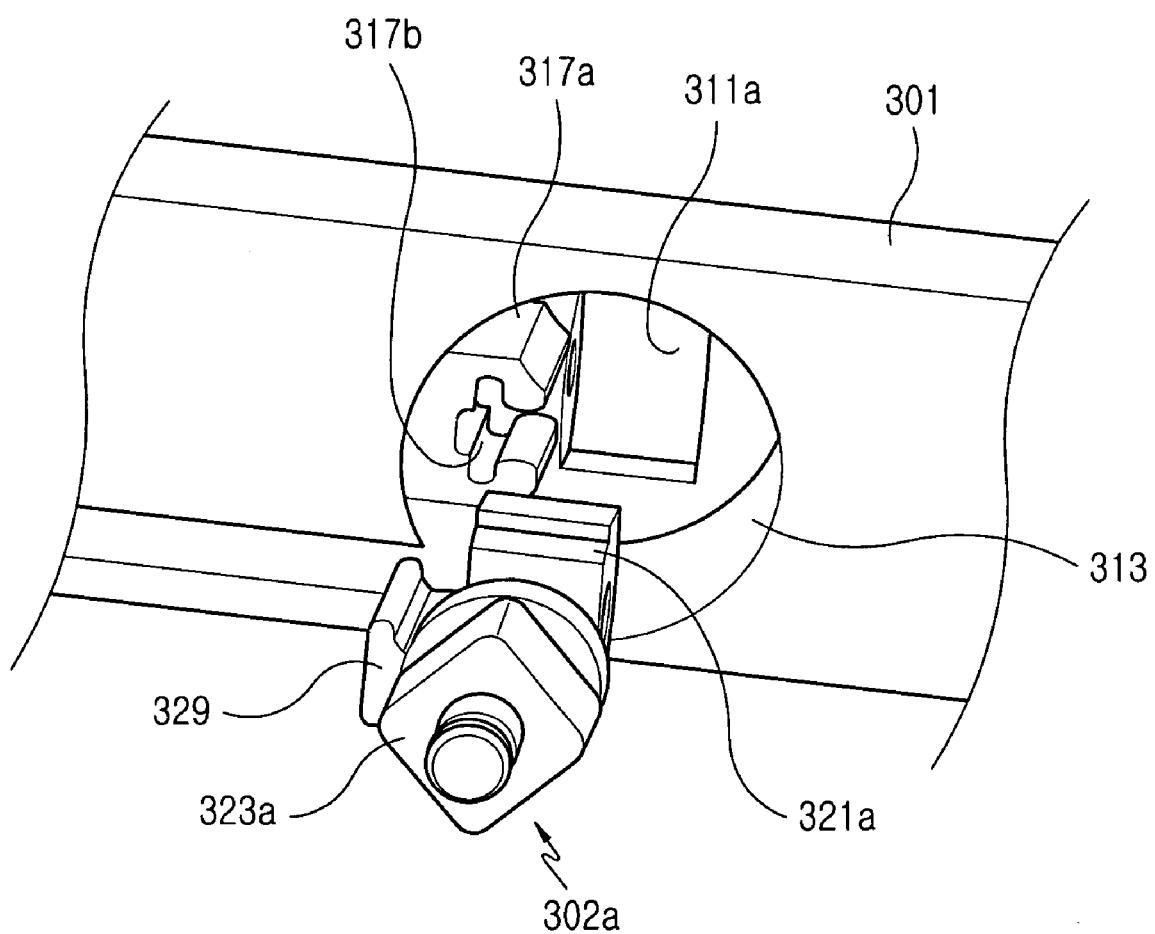
FIG. 12 is a perspective view illustrating a coupling relation between a first hinge housing and a main shaft of the rotary type hinge device shown in FIG. 11.

FIG. 12 illustrates the first hinge housing 301 formed with a fixing groove 311a, which is surrounded by ribs extended up to a certain height at the inner peripheral surface thereof exposed through the opening 313. The first hinge housing 301 further comprises a first guide rail 317a and a guide groove 317b. The first guide rail 317a extends in a direction of the second rotation axis A2 (FIG. 11) from one side of the fixing groove 311a. The guide groove 317b is formed in the direction of the second rotation axis A2 (FIG. 1) at one surface of the first guide rail 317a facing the fixing groove 311a. The first guide rail 317a defines a slit 319 (FIG. 13) between its one side and the inner surface of the first hinge housing 301. The slit 319 (FIG. 13) is used for wiring a flexible printed circuit (not shown).

The fixing groove 311a and guide groove 317b are used to fix the main shaft 302a. Each rib surrounding the fixing groove 311a is formed with a first fixing hole 311b (shown in FIG. 13) at a certain position. The first fixing hole 311b extends in the direction of the first rotation axis A1.

Turning back to FIG. 1, the first hinge housing 301 receives an opening/closing hinge module 109 therein at its one side. The opening/closing hinge module 109 is adapted to provide a rotating force to cause the folder to be unfolded, opened if the folder is opened away from the terminal body exceeding a predetermined angle, and also adapted to provide a rotating force to cause the folder to be folded, closed if the folder is opened away from the terminal body below the predetermined angle. The opening/closing hinge module 109 is applied to the hinge device 300 in the same manner as U.S. Pat. No. 6,292,980, filed on Sep. 25, 2001 and issued to the applicant of the present invention. The first hinge housing 301 is formed with a dummy hole 315 at an opposite side of the hinge module 109. The dummy hole 315 is adapted to be coupled with a certain-shaped hinge dummy (not shown), thereby allowing the first hinge housing 301 to be rotatably coupled with the terminal body of the portable wireless terminal.

Figure 13:
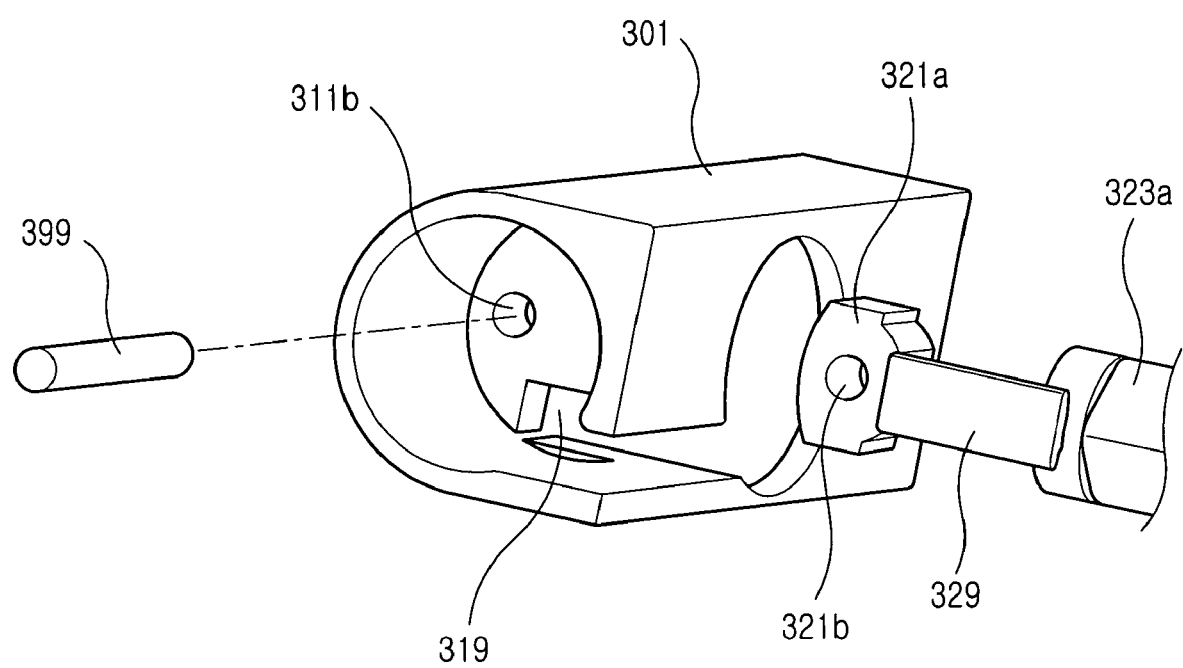
FIG. 13 is a perspective view illustrating another coupling relation between the first hinge housing and the main shaft of the rotary type hinge device shown in FIG. 11.
Figure 14:
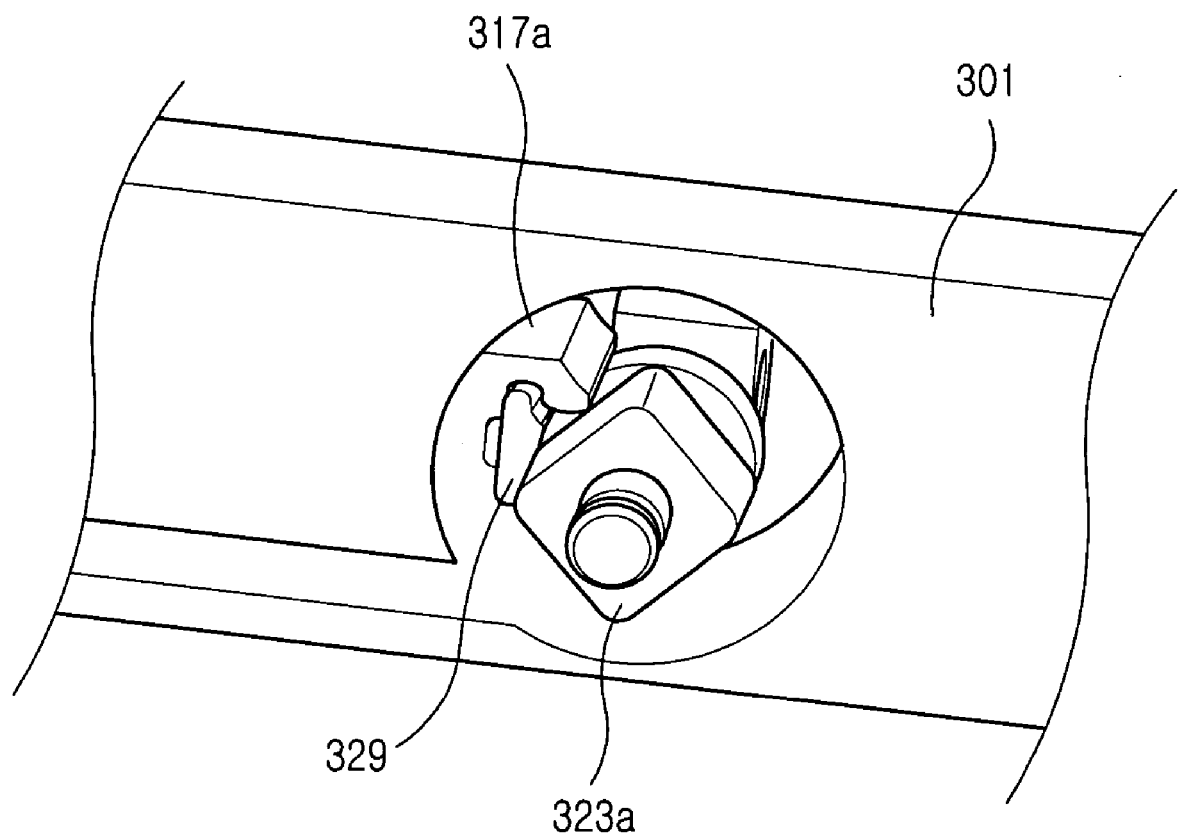
FIG. 14 is a perspective view illustrating a state wherein the first hinge housing and main shaft of the rotary type hinge device shown in FIG. 11 are coupled to each other.

The main shaft 302a, extended in the direction of the second rotation axis A2, is provided at its both ends with a fixing end 321a and a shaft cam 323a, respectively, and also formed with a second guide rail 329 longitudinally extending at its one side. The fixing end 321a has a shape corresponding to the fixing groove 311a, and is formed with a second fixing hole 321b confronting with the fixing hole 311b when the fixing end 321a is coupled with the fixing groove 311a. As shown in FIG. 13, after the fixing end 321a is coupled with the fixing groove 311a, a fixing pin 399 is inserted into the first and second fixing holes 311b and 321b. At this time, the second guide rail 329 is inserted into the guide groove 317b. That is to say, as the fixing groove 311a and the fixing end 321 a are coupled with each other and the guide groove 317b and the second guide rail 329 are coupled with each other, the main shaft 302a is firmly fixed to the first hinge housing 301. The shaft cam 323a is protruded outwardly from the first hinge housing 301, and formed with at least one pair of flat stopper surfaces at opposite sides thereof. The shaft cam 323a is formed at its upper end with a certain-shaped protrusion, which is formed at its outer peripheral surface with a fastening groove 327a. The fastening groove 327a is adapted to be fastened with an E-ring 381.

The second hinge housing 303 is rotatably coupled to the end of the main shaft 302a, and adapted to rotate about the second rotation axis A2. As the second hinge housing 303 rotates about the second rotation axis A2, the folder is adapted to reverse its front and rear surfaces with each other in a state wherein it is previously opened away from the terminal body. The second hinge housing 303 has a certain receiving space defining unit 331. The receiving space defining unit 331 is formed at its lower and upper end surfaces with respective coupling holes 333, through which the other end of the main shaft 302a is adapted to be penetrated. The coupling holes 333 are positioned on the second rotation axis A2. The fastening groove 327a formed at the end of the main shaft 302a is protruded outwardly from the upper end surface of the second hinge housing 303 after passing through the coupling holes 333, and then the E-ring 381 is fastened to the protruded fastening groove 327a. The E-ring 381 and the upper end of the second hinge housing 303 interpose a washer 383 therebetween. The washer 383 is coupled to the end of the main shaft 302a, and adapted to prevent the wearing of the E-ring 381 and second hinge housing 303 during the rotation of the second hinge housing 303. When the second hinge housing 303 is coupled to the end of the main shaft 302, the shaft cam 323a is positioned in the receiving space defining unit 331 of the second hinge housing 303.

The second hinge housing 303 has fastening arms 337 extended outwardly in opposite directions from both sides thereof. The fastening arms 337 are formed with fastening holes 339 at their opposite ends, thereby providing means for coupling the second hinge housing 303 to the folder.

The receiving space defining unit 331 of the second hinge housing 303 receives a plate spring 349a, and a pair of stopper cams 341a adapted to receive an elastic force of the plate spring 349a. The plate spring 349a extends in a transverse direction of the receiving space defining unit 331. The plate spring 349a has elastic pieces formed by bending both ends thereof. The elastic pieces extend to face each other, thereby providing the elastic force to the stopper cams 341a.

The pair of stopper cams 341a are positioned to face each other and are formed with support recesses 343b at their outer sides, and stopper recesses 343a at their inner sides facing each other. The support recesses 343b are supported by the elastic pieces, respectively. Each stopper recess 343a has a shape corresponding to a corner formed by adjacent stopper surfaces of the shaft cam 323a. The shaft cam 323a and stopper cams 341a come into close contact with each other due to the elastic force of the elastic pieces. Therefore, the rotation of the second hinge housing 303 is stopped in a position that the corners and stopper recesses 343a are engaged with each other.

Figure 15:
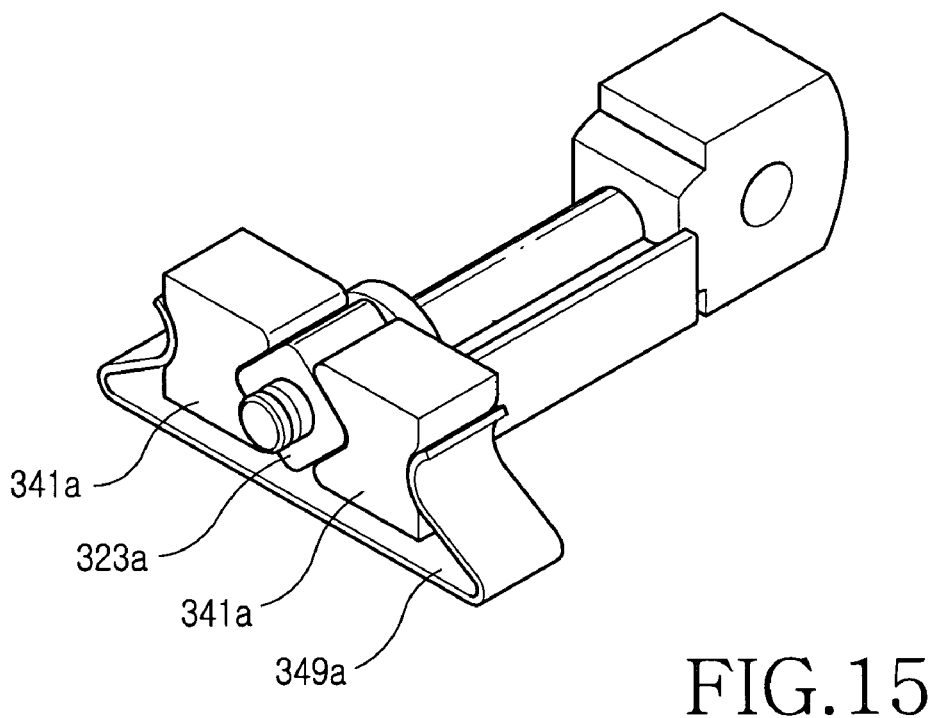
FIG. 15 is a perspective view illustrating a shaft cam and stopper cam of the rotary type hinge device shown in FIG. 11.
Figure 16:
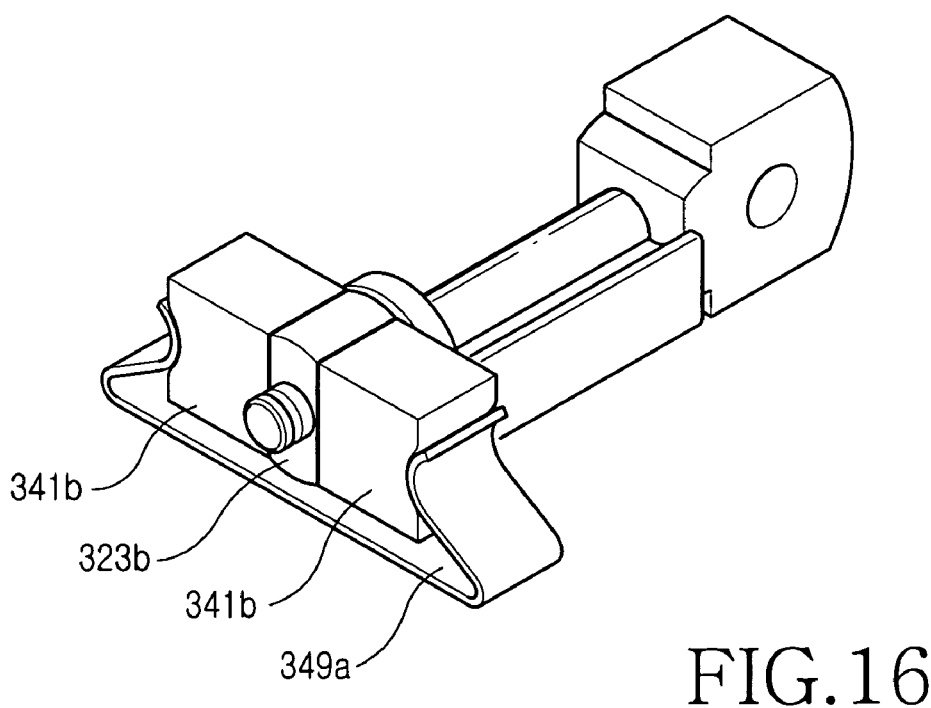
FIG. 16 is a perspective view illustrating another type of shaft cam and stopper cam of the rotary type hinge device shown in FIG. 11.
Figure 17:
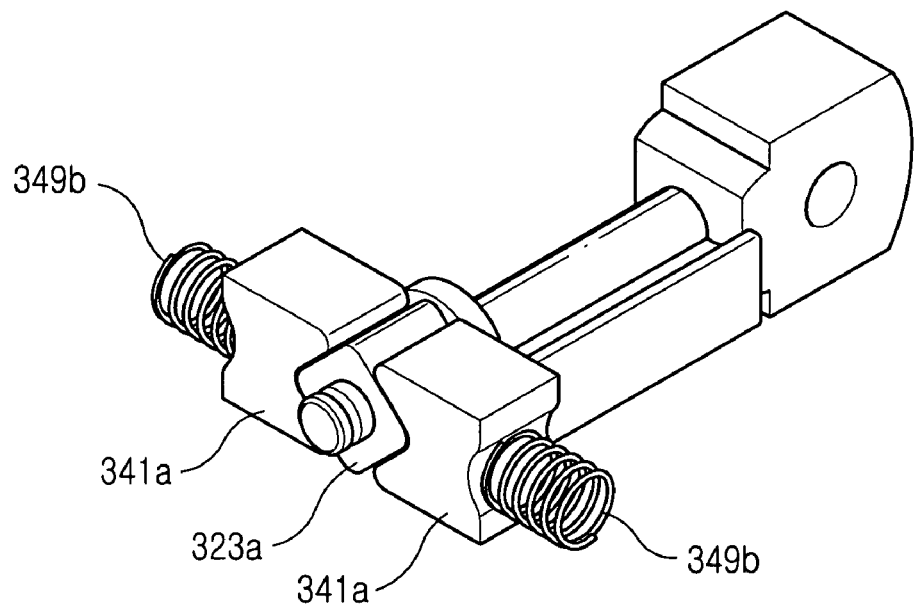
FIG. 17 is a perspective view illustrating still another type of shaft cam and stopper cam of the rotary type hinge device shown in FIG. 11.
Figure 18:
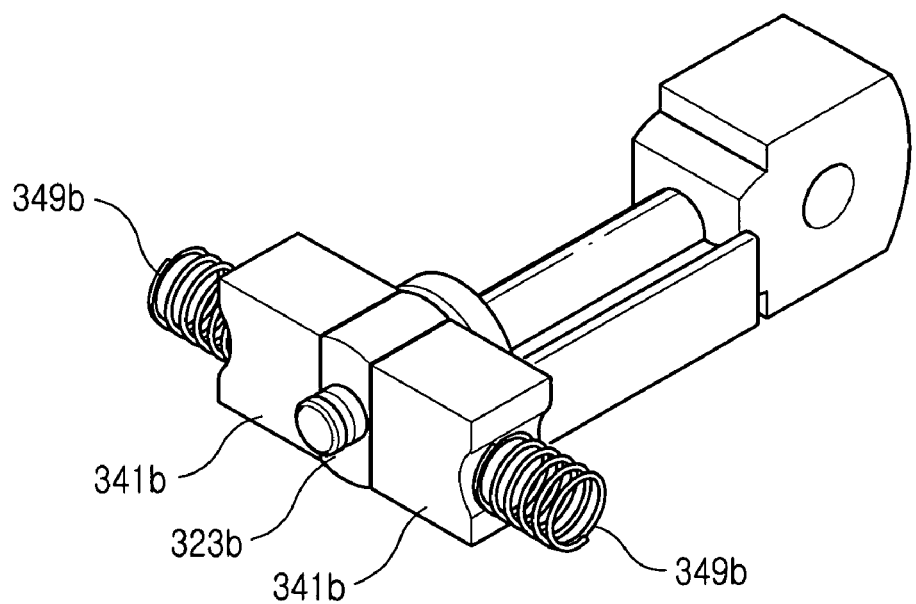
FIG. 18 is a perspective view illustrating still another type of shaft cam and stopper cam of the rotary type hinge device shown in FIG. 11.

As shown in FIGS. 15 to 18, the shaft cam and stopper cam may be formed into various constructions. The shaft cam 323a or 323b may have two pairs of stopper surfaces, as shown in FIGS. 15 and 17, or may have a pair of stopper surfaces, as shown in FIGS. 16 and 18.

In accordance with the shape of the shaft cam 323a or 323b illustrated in FIGS. 11-19, the stopper cam 341a or 341b is formed with stopper recesses or stopper surfaces. Where the shaft cam 323a or 323b has two pairs of stopper surfaces, the rotation of the second hinge housing 303 is stopped at an interval of 90°. Where the shaft cam 323a or 323b has a pair of stopper surfaces, the rotation of the second hinge housing 303 is stopped at an interval of 180°. In addition, where the shaft cam 323a or 323b has two pairs of stopper surfaces, it should be clearly understood that the rotation of the second hinge housing 303 is stopped at an interval of 90° even if the stopper cam 341a has a certain surface corresponding to the stopper surface of the shaft cam, instead of the stopper recess.

As shown in FIG. 17 or 18, the plate spring 349a (FIG. 1) may be substituted with coil springs 349b supporting the both ends of the stopper cam 341a or 341b. This will be appreciated from the previous embodiment.

Figure 19:
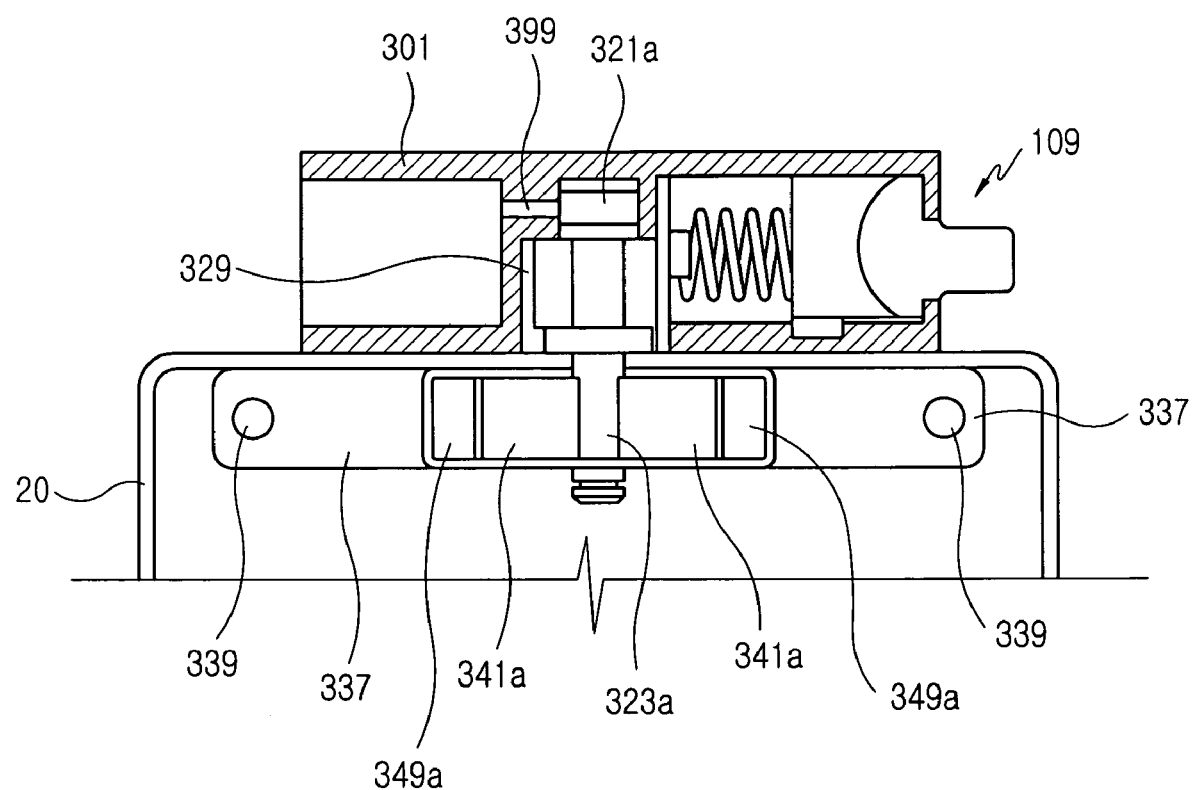
FIG. 19 is a view illustrating a state wherein the rotary type hinge device shown in FIG. 11 is coupled to a folder.

FIG. 19 is a view illustrating a state wherein the rotary type hinge device 300 constructed as stated above is coupled to the folder 20. As shown in FIG. 19, the second hinge housing 303 is fixed to the folder 20 of the portable wireless terminal, and the first hinge housing 301 comes into close contact with the end of the folder 20. The second hinge housing 303 is firmly fixed to the folder 20 by fastening screws (not shown) through the fastening holes 339. In addition, the second hinge housing 303 may be integrally formed with the folder 20 using an injection molding method and so on. Although not shown, the first hinge housing 301 is rotatably coupled to the terminal body.

As apparent from the above description, the present invention provides a rotary type hinge device for use in a portable wireless terminal, which enables the biaxial rotation of a folder, thereby enabling the reversal of front and rear surfaces of the folder. Therefore, in order to allow the portable wireless terminal to be appropriately utilized in motion picture providing services, video communications and so on according to mobile services becoming increasingly diversified, the rotary type hinge device thereof is adapted to easily harmonize an image display direction of a display device and an image capturing direction of a camera lens, thereby allowing the design or specification of the terminal to be easily changed. Further, according to the present invention, it is possible to prevent any excessive tension force from being applied to a flexible printed circuit, serving to provide the electrical connection between the folder and a terminal body, even if the folder of the portable wireless terminal is rotated at various angles.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A rotary type hinge device for a portable wireless terminal, which is installed between a terminal body and a folder of the portable wireless terminal, the hinge device comprising:
    a first rotation axis for opening and closing the folder with respect to the terminal body and a second rotation axis extending perpendicular to the first rotation axis and adapted to rotate relative to the first rotation axis, the hinge device being adapted to rotate the folder about the second rotation axis in a state wherein the folder and terminal body are opened;
    a first hinge housing coupled to the terminal body to rotate about the first rotation axis, the first hinge housing being formed with a fixing portion at its inner peripheral surface, and an opening adapted to expose the fixing portion in a direction of the second rotation axis;
    a main shaft provided at one end with a fixing end having a shape corresponding to that of the fixing portion, the main shaft extending in the direction of the second rotation axis and being adapted to protrude outwardly through the opening of the first hinge housing at the other end thereof; and
    a second hinge housing rotatably coupled to the other end of the main shaft protruding outwardly from the first hinge housing and adapted to rotate about the second rotation axis, the second hinge housing being fixed to the folder,
    wherein a flexible printed circuit protrudes from an interior space of the folder and extends longitudinally at one side of the main shaft, thereby entering into the first hinge housing through the opening thereof, and the flexible printed circuit is wound at least half way around the main shaft within the first hinge housing and then drawn from one side end of the first hinge housing.

2. The rotary type hinge device as set forth in claim 1, wherein the main shaft is adapted to penetrate from a lower end surface of the second hinge housing to an upper end surface thereof, thereby causing the one end to be protruded from the upper end surface of the second hinge housing, the protruding end of the main shaft being fastened with an E-ring.

3. The rotary type hinge device as set forth in claim 2, further comprising:
    a shaft cam provided at the main shaft positioned within the second hinge housing, the shaft cam being formed at its outer peripheral surface with at least one pair of stopper recesses arranged on opposite sides of the shaft cam, respectively; and
    stopper cams formed at their respective first ends with stopper projections having a shape corresponding to the stopper recesses, respectively, the stopper cams being adapted to stop a rotation of the second hinge housing by receiving an elastic force within the second hinge housing at a position that the stopper recesses and stopper projections come into close contact with each other, respectively, the stopper cams linearly reciprocating within the second hinge housing in accordance with the rotation of the second hinge housing.

4. The rotary type hinge device as set forth in claim 3, wherein the respective stopper recesses of the shaft cam extend in a direction perpendicular to the second rotation axis.

5. The rotary type hinge device as set forth in claim 3, wherein the respective stopper recesses of the shaft cam extend in a direction parallel to the second rotation axis 6. The rotary type hinge device as set forth in claim 3, wherein a pair of stopper cams are arranged to face the shaft cam, respectively, at diametrically opposite sides of the shaft cam.

7. The rotary type hinge device as set forth in claim 3, wherein the second hinge housing is formed with a sliding guide extending longitudinally at its inner peripheral surface, and each stopper cam is formed at its outer peripheral surface with a guide protrusion corresponding to the sliding guide, whereby the sliding guide and guide protrusion are adapted to guide linear reciprocating movements of the stopper cam.

8. The rotary type hinge device as set forth in claim 2, further comprising:
    a shaft cam provided at the main shaft positioned within the second hinge housing, the shall cam being formed at its outer peripheral surface with at least one pair of flat stopper surfaces arranged on opposite sides of the shaft cam, respectively; and
    stopper cams formed at their respective first ends with stoppers, having a flat surface shape, being adapted to face the flat stopper surfaces, respectively, the stopper cams being adapted to stop a rotation of the second hinge housing by receiving a elastic force within the second hinge housing at a position tat the flat stopper surfaces and stoppers come into close contact with each other, the stopper cans linearly reciprocating within the second hinge housing in accordance with the rotation of the second hinge housing.

9. The rotary type hinge device as set forth in claim 8, wherein a pair of stopper cams are arranged to face the shaft cam at diametrically opposite sides of the shaft cam.

10. The rotary type hinge device as set forth in claim 8, wherein the second hinge housing is formed with a sliding guide extending longitudinally at its inner peripheral surface, and each stopper cam is formed at its outer peripheral surface with a guide protrusion corresponding to the sliding guide, whereby the sliding guide and guide protrusion are adapted to guide linear reciprocating movements of the stopper cam 11. The rotary type hinge device as set forth in claim 2, wherein the second hinge housing further comprises fastening arms extended outwardly from both sides thereof, the fastening arms being formed with fastening holes at their opposite ends, respectively.

12. The rotary type hinge device as set forth in claim 1, wherein the second hinge housing is fixed within one end region of the folder.

13. The rotary type hinge device as set forth in claim 1, further comprising a folder opening/closing hinge module received within one side of the first hinge housing, the hinge module providing a rotating force to cause the folder to be opened if the folder is opened away from the terminal body exceeding a predetermined angle, and to cause the folder to be closed if the folder is away from the terminal body below the predetermined angle.

14. A rotary type hinge device for a portable wireless terminal comprising:
 a first hinge housing, which is rotatable about a first rotation axis longitudinally extending through both cads thereof, the first hinge housing being formed at its inner peripheral surface with a fixing surface, and at its outer peripheral surface with an opening adapted to expose the fixing surface perpendicular to the first rotation axis;
 a main shaft provided at one end with a fixing end having a shape corresponding to that of the fixing surface, the main shaft extending from the fixing end in a direction perpendicular to the first rotation axis, and being adapted to protrude outwardly through the opening of the first hinge housing at the other end thereof, thereby providing a second rotation axis;
 a second hinge housing rotatably coupled to the other end of the main shaft and adapted to rotate about the second rotation axis;
 a perforated hole formed at a lower end surface of the second hinge housing;
 a shaft cam provided at the other end of the main shaft and adapted to be inserted through the perforated hole, thereby being positioned within the second hinge housing, the shaft cam being formed at its outer peripheral surface with at least one pair of stopper recesses arranged on opposite sides of the shaft cam, respectively; and
 stopper cams formed at their respective one ends with stopper projections having a shape corresponding to the stopper recesses, respectively, the stopper cams being adapted to stop a rotation of the second hinge housing by receiving an elastic force within the second hinge housing at a position that the stopper recesses and stopper projections come into close contact with each other, respectively, the stopper cams linearly reciprocating within the second hinge housing in accordance with the rotation of the second hinge housing.

15. The rotary type hinge device as set forth in claim 14, wherein the respective stopper recesses of the shaft cam extend in a direction perpendicular to the second rotation axis.

16. The rotary type hinge device as set forth in claim 14, wherein the respective stopper recesses of the shaft cam extend in a direction parallel to the second rotation axis.

17. The rotary type hinge device as set forth in claim 14, wherein a pair of stopper cams are arranged to face the shaft cam at diametrically opposite sides of the shaft cam.

18. The rotary type hinge device as set forth in claim 14, further comprising:
 a perforated hole formed at a lower end surface of the second hinge housing;
 a shaft cam provided at the other end of the main shaft and adapted to be inserted through the perforated hole, thereby being positioned within the second hinge housing, the shaft cam being formed at its outer peripheral surface with at least one pair of flat stopper surfaces arranged on opposite sides of the shaft cam, respectively; and
 stopper cams formed at their respective one ends with stoppers buying a flat surface shape, being adapted to face the flat stopper surfaces, respectively, the stopper cams being adapted to stop a rotation of the second hinge housing by receiving an elastic force within the second hinge housing at a position that the flat stopper surfaces and stoppers come into close contact with each other, the stopper cams linearly reciprocating within the second hinge housing in accordance with the rotation of the second hinge housing.

19. A rotary type hinge device for a portable wireless terminal, which is installed between a terminal body and a folder of the portable wireless terminal, the hinge device comprising:
 a first rotation axis for opening and closing the folder with respect to the terminal body and a second rotation axis extending perpendicular to the first rotation axis and adapted to rotate relative to the first rotation axis, the hinge device being adapted to rotate the folder about the second rotation axis in a state wherein the folder and terminal body are opened;
 a first hinge housing coupled to the terminal body to rotate about the first rotation axis, the first hinge housing being formed with a fixing groove surrounded by ribs extended to a certain height at its later peripheral surface, and an opening adapted to expose the fixing groove in a direction of the second rotation axis;
 a main shaft provided at one end with a fixing end having a shape corresponding to that of the fixing groove, the main shaft extending in the direction of the second rotation axis and adapted to protrude outwardly through the opening of the first hinge housing at the other end thereof;
 a second hinge housing rotatably coupled to the other end of the main shaft protruding outwardly from the first hinge housing and adapted to rotate about the second rotation axis, the second hinge housing being fixed to the folder;
 a shaft cam formed at its outer peripheral surface positioned within the second hinge housing with at least two pairs of stopper surfaces arranged on opposite sides of the shaft cam, respectively; and
 stopper cams formed at their respective one ends with stopper recesses having a shape corresponding to corners formed by adjacent stopper surfaces, respectively, the stopper cams being adapted to stop a rotation of the second hinge housing by receiving a certain elastic force within the second hinge housing at a position that the corners of the shaft cam and the stopper recesses come into close contact with each other, respectively, the stopper cams linearly reciprocating within the second hinge housing in accordance with the rotation of the second hinge housing, wherein the main shaft penetrates the second hinge housing.

20. The rotary type hinge device as set forth in claim 19, wherein the first hinge housing is further formed with a first guide rail extending in the direction of the second rotation axis at one side of the fixing groove, and a guide groove formed along the direction of the second rotation axis at one surface of the guide rail facing the fixing groove; and the main shaft is further formed at its one side with a second guide rail extended in the direction of the second rotation axis and adapted to be inserted into the guide groove.

21. The rotary type hinge device as set forth in claim 20, wherein the first guide rail defines a slit, having a certain width, between its one side and an inner side wall of the first hinge housing.

22. The rotary type hinge device as set forth in claim 19, wherein each rib surrounding the fixing groove is formed with a first fixing hole penetrating in a direction of the first rotation axis, and the fixing end of the main shaft is formed with a second fixing hole penetrating in the direction of the first rotation axis, thereby confronting with the first fixing hole;

further comprising a fixing pin fastened through the first and second fixing holes in the direction of the first rotation axis after the fixing end is coupled to the fixing groove, thereby fixing the fixing end.

23. The rotary type hinge device as set forth in claim 19, further comprising a plate spring received within the second hinge housing, the plate spring being configured so that its both ends are bent and extended to face each other, thereby providing an elastic force to cause the stopper cams to come into close contact with the shaft cam, wherein the stopper cams are provided at both sides of the shaft cam, respectively.

24. The rotary type hinge device as set forth in claim 19, further comprising coil springs received within the second hinge housing, the coil springs being adapted to provide an elastic force to the stopper cams, thereby causing the stopper cams to come into close contact with the shaft cam, wherein the stopper cams are provided at both sides of the shaft cam, respectively.

25. The rotary type hinge device as set forth in claim 19, further comprising:

a shaft cam formed at an outer peripheral surface of the main shaft positioned within the second hinge housing with at least one pair of first stopper surf hoes arranged on opposite sides of the shaft cam, respectively; and stopper cams formed at their respective one ends with second stopper surfaces facing the first stopper surfaces, respectively, the stopper cams being adapted to stop a rotation of the second hinge housing by receiving an elastic force within the second hinge housing at a position that the first and second stopper surfaces come into close contact with each other, respectively, the stopper cams linearly reciprocating within the second hinge housing in accordance with the rotation of the second hinge housing, wherein the main shaft penetrates the second hinge housing 26. The rotary type hinge device as set forth in claim 25, further comprising a plate spring received within the second hinge housing, the plate spring being configured so that its both ends arc bent and extended to face each other, thereby providing an elastic force to cause the stopper cams to come into close contact with the shaft cam, wherein the stopper cams ate provided at both sides of the shaft cam, respectively.

27. The rotary type hinge device as set forth in claim 25, further comprising coil springs received within the second hinge housing, the coil springs being adapted to provide an elastic force to the stopper cams, thereby causing the stopper cams to come into close contact with the shaft cam, wherein the stopper cams are provided at bath sides of the shaft cam, respectively.

* * * * *